United States Patent
Zou et al.

(10) Patent No.: US 10,649,493 B2
(45) Date of Patent: May 12, 2020

(54) VIRTUAL REALITY ALL-IN-ONE APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Bin Zou, Beijing (CN); Wenhong Tian, Beijing (CN); Yunshuang Li, Beijing (CN); Zhenhuan Tian, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 242 days.

(21) Appl. No.: 15/743,006

(22) PCT Filed: Jun. 6, 2017

(86) PCT No.: PCT/CN2017/087258
§ 371 (c)(1),
(2) Date: Jan. 9, 2018

(87) PCT Pub. No.: WO2018/095010
PCT Pub. Date: May 31, 2018

(65) Prior Publication Data
US 2018/0217637 A1    Aug. 2, 2018

(30) Foreign Application Priority Data

Nov. 24, 2016 (CN) .......................... 2016 1 1053525

(51) Int. Cl.
*G06F 1/16* (2006.01)
*G06F 1/20* (2006.01)
(Continued)

(52) U.S. Cl.
CPC ....... *G06F 1/1637* (2013.01); *G02B 27/0172* (2013.01); *G02B 27/0176* (2013.01);
(Continued)

(58) Field of Classification Search
CPC ...... G02B 27/0176; G06F 1/16; G06F 1/1637
See application file for complete search history.

(56) References Cited

U.S. PATENT DOCUMENTS 5,757,546 A    5/1998 Lipton et al.
2010/0246022 A1    9/2010 Matsumoto et al.
(Continued)

FOREIGN PATENT DOCUMENTS

CN    205644372 U    10/2016
CN    205721634 U    11/2016

OTHER PUBLICATIONS

International Search Report dated Sep. 7, 2017, issued in counterpart International Application No. PCT/CN2017/087258 (11 pages).

*Primary Examiner* — Robert E. Tallman
(74) *Attorney, Agent, or Firm* — Westerman, Hattori, Daniels & Adrian, LLP

(57) ABSTRACT

The present invention is mainly related to a virtual reality all-in-one apparatus. The virtual reality all-in-one apparatus may comprise a middle frame, a front housing, and a core function module. The core function module may comprise a frame assembly and a display module mounted on the frame assembly.

15 Claims, 8 Drawing Sheets

(51) Int. Cl.
*G02B 27/01* (2006.01)
*G06T 19/00* (2011.01)

(52) U.S. Cl.
CPC ............... *G06F 1/16* (2013.01); *G06F 1/163* (2013.01); *G06F 1/203* (2013.01); *G06T 19/006* (2013.01); *G02B 2027/0134* (2013.01)

(56) References Cited

U.S. PATENT DOCUMENTS

2015/0138645 A1* 5/2015 Yoo .................... G02B 27/0101
 359/630
2016/0127717 A1* 5/2016 Petrov ...................... G09G 3/36
 345/419
2016/0255748 A1* 9/2016 Kim .................. H05K 7/20972
 361/695
2016/0366399 A1* 12/2016 Tempel ................. G06T 19/006

* cited by examiner

VIRTUAL REALITY ALL-IN-ONE APPARATUS

CROSS-REFERENCE TO RELATED APPLICATIONS

This application claims the benefit of the filing date of Chinese Patent Application No. 201611053525.7 filed on Nov. 24, 2016, the disclosure of which is hereby incorporated by reference.

TECHNICAL FIELD

This invention relates to display technology, and more particularly, to a virtual reality all-in-one apparatus.

BACKGROUND

Virtual Reality (VR) technology is a technology that utilizes computer simulation system to create and experience a virtual world. The VR technology first uses computers to generate a simulated environment. Then, users are immersed in the simulated environment through interactive three-dimensional dynamic view of multi-source information integration and system simulation of entity behavior.

In conventional technology, in order to realize a virtual reality display, a virtual reality apparatus typically includes a housing, a display screen disposed inside the housing, an optical lens assembly, and a circuit board, etc. During assembly of the virtual reality apparatus, it is necessary to sequentially mount the above-mentioned components on the housing. However, when hardware or optical system of a VR apparatus is upgraded, it is necessary to adjust sizes of multiple components such as the display screen, the optical lens assembly, or the circuit board in the VR apparatus. In this case, in order to accommodate the sizes of the upgraded components, it is necessary to re-design structure of the housing and accordingly develop new molds for manufacturing the new housing. This in turn prolongs a production and marketing cycle of a product, thereby reducing market competitiveness of the product.

BRIEF SUMMARY

Accordingly one example of the present disclosure is a virtual reality all-in-one apparatus. The virtual reality all-in-one apparatus may comprise a middle frame, a front housing on a side of the middle frame, and a core function module inside the middle frame. The core function module may comprise a frame assembly and a display module mounted on the frame assembly. The display module may comprise a display screen and an optical lens assembly located on a display side of the display screen. The frame assembly may comprise a first frame and a second frame opposite the first frame, the display screen being mounted on the first frame and the optical lens assembly being mounted on the second frame. In one embodiment, the display screen may comprise a display screen body and a slit grating located on a display side of the display screen body, wherein the slit grating may comprise slits formed between light-shielding stripes. In another embodiment, the display screen may include a left-eye image sub-screen and a right-eye image sub-screen. The first frame may include a first left sub-frame and a first right sub-frame located at the same level. The left eye image sub-screen and the right eye image sub-screen may be mounted on the first left sub-frame and the first right sub-frame respectively. The optical lens assembly may comprise a left lens subassembly and a right lens subassembly. The second frame may comprise a second left sub-frame and a second right sub-frame located at the same level. The left lens subassembly and the right lens subassembly may be mounted on the second left sub-frame and the second right sub-frame respectively.

The virtual reality all-in-one apparatus may further comprise a baffle plate between the first frame and the second frame, the baffle plate perpendicular to the first frame and the second frame, and the second left sub-frame and the second right sub-frame on both sides of the baffle plate respectively. The display module may further comprise a main control circuit board. The frame assembly may further comprise a third frame for mounting the main control circuit board. The third frame may be on the same side of the display screen as the first frame and the second frame, and two ends of the third frame may be connected with the first frame and the second frame respectively.

The virtual reality all-in-one apparatus may further comprise a fan on the main control circuit board and a heat dissipation window on the middle frame corresponding to a position of the fan. The fan may be an axial fan or a centrifugal fan. The heat dissipation window may comprise a plurality of dustproof bars arranged at intervals. The front housing may comprise a first surface covering the display screen, a second surface and a third surface on both sides of the first surface respectively. A heat dissipation window may be on the second surface, and the third surface and the surface of the middle frame having the heat dissipation window may be on the same side of the first surface. A heat dissipation window may be on the third surface. The display module may further comprise an interface board, the frame assembly may further comprise a fourth frame on a side of the second frame, and the interface board may be mounted on the fourth frame. The frame assembly and the middle frame may be connected by a first fixing assembly. The frame assembly and the front housing may be connected by a second fixing assembly. The front housing and the middle frame may be connected by a third fixing assembly.

The virtual reality all-in-one apparatus may further comprise a face-mounting assembly at a side of the middle frame opposite to the front housing. The face-mounting assembly may be connected to the frame assembly through a fourth fixing assembly. Each of the first fixing assembly, the second fixing assembly, the third fixing assembly, or the fourth fixing assembly may comprise a positioning pin and a matching threaded hole, or a hook and a matching slit. An air filter may be arranged between the front housing and the display screen. The frame assembly may be made of metal.

The virtual reality all-in-one apparatus may further comprise a button assembly on the middle frame. The button assembly may comprise a sound adjustment button, a screen adjustment button, or a power button.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
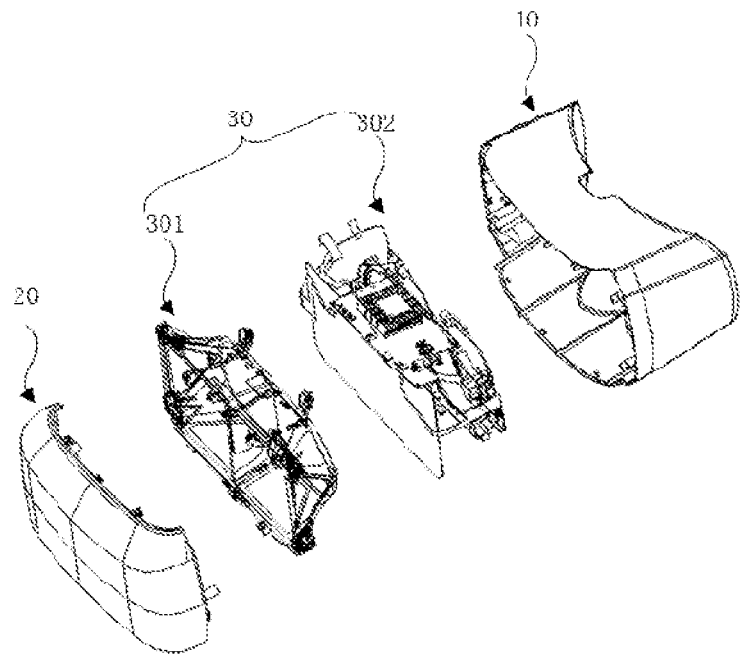
FIG. 1 is a schematic view of a decomposed structure of a virtual reality all-in-one apparatus according to one embodiment.

The present invention is described with reference to embodiments of the invention. Throughout the description of the invention reference is made to FIGS. 1-13. When referring to the figures, like structures and elements shown throughout are indicated with like reference numerals. The described embodiments are merely part of the present invention, and do not constitute all embodiments. All other embodiments obtained by those skilled in the art without departing from the inventive work are within the scope of the present invention.

FIG. 1 shows a schematic view of a decomposed structure of a virtual reality all-in-one apparatus (hereinafter referred to as a VR all-in-one apparatus) according to one embodiment. As shown in FIG. 1, the VR all-in-one apparatus comprises a middle frame 10 and a front housing 20 mounted on a side of the middle frame 10. Furthermore, the VR all-in-one apparatus further comprises a core function module 30, which is provided inside the middle frame 10. The core function module 30 includes a frame assembly 301 and a display module 302. The display module 302 is mounted on the frame assembly 301, as shown in FIG. 2.

Figure 2:
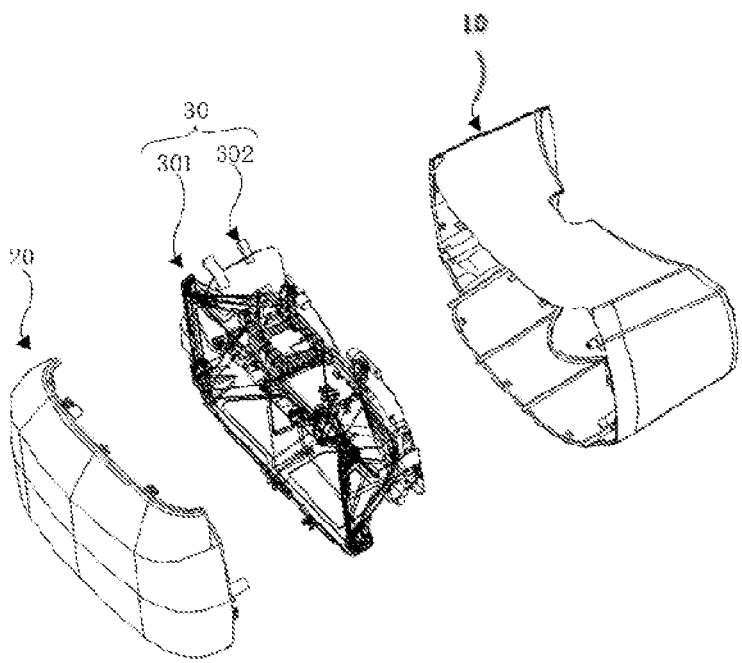
FIG. 2 is a schematic structural view of a display module on a frame assembly according to one embodiment.

FIG. 2 shows a schematic structural view of a display module on a frame assembly according to one embodiment. As described above, the display module 302 is mounted on the frame assembly 301. Thus, when sizes of some components of the display module 302 change due to upgrade of some hardware or optical system in the display module 302, the core function module 30 can be directly disassembled from the middle frame 10, and furthermore, the components to be upgraded in the display module 302 can be disassembled from the frame assembly 301. Then, shape and structure of the frame assembly 301 may be adjusted so that the upgraded components can still be fixed to the frame assembly 301. In this way, modular design of the display module 302 can be achieved through the core function module 30. As such, when the sizes of some components of the display module 302 change, the core function module 30 is directly adjusted without re-designing the shape and size of the housing, such as the middle frame 10. Accordingly, investment in mold development is reduced, product market cycle is shortened, and family characteristic of a product line is formed.

Figure 3:
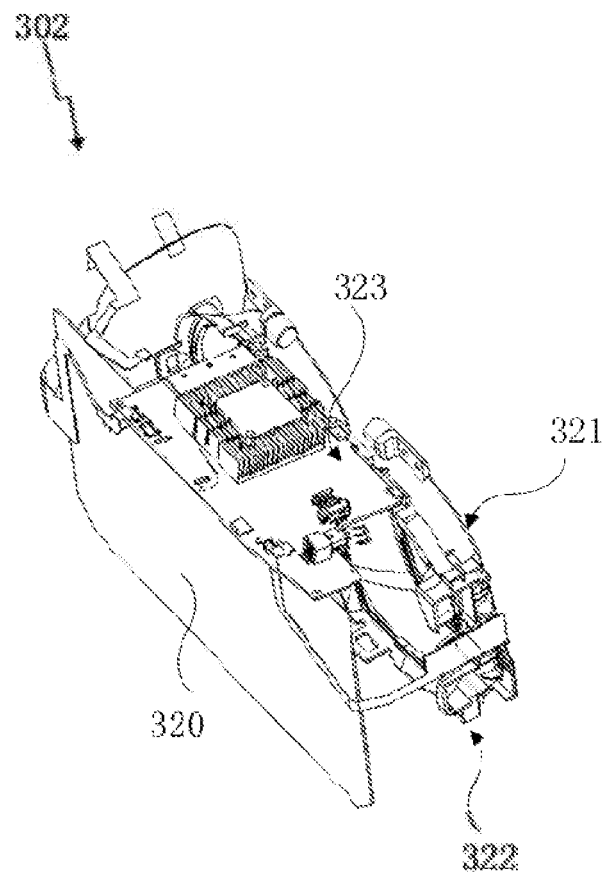
FIG. 3 is a schematic structural view of a display module according to one embodiment.

FIG. 3 shows a schematic structural view of a display module according to one embodiment. Specific configuration of a frame assembly 301 and a display module 302 mounted on the frame assembly 301 are described in detail below. The VR all-in-one apparatus realizes 3D display mainly through a display module 302. In one embodiment as shown in FIG. 3, the display module 302 comprises a display screen 320. The display screen 320 is capable of displaying a left-eye image and a right-eye image. After the left-eye image and the right-eye image are transmitted to a human brain through left eye and right eye respectively, these images are synthesized by the human brain to form a 3D image.

Figure 4:
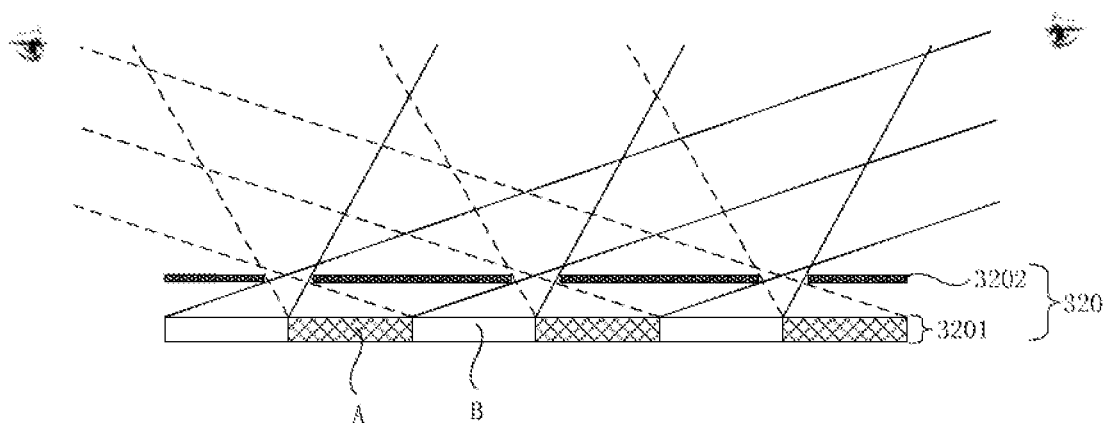
FIG. 4 is a schematic diagram of principle of displaying a 3D image on a display screen according to one embodiment.

FIG. 4 shows a schematic diagram of principle of displaying a 3D image on a display screen according to one embodiment. In this embodiment, as shown in FIG. 4, in order to enable the display screen 320 to display a left-eye image and a right-eye image, the display screen 320 may comprise a display screen body 3201 and a slit grating 3202 located on a display side of the display screen body 3201. The slit grating 3202 is an optical apparatus comprising spaced light-shielding stripes. A user's left eye may see the left-eye image provided by a portion of pixels (e.g., multiple pixels B) on the display screen body 3201 through slits of the slit grating 3202. A user's right eye may see the right-eye image provided by another portion of pixels (e.g., multiple pixels A) of the display screen body 3201 through slits of the slit grating 3202.

Figure 5:
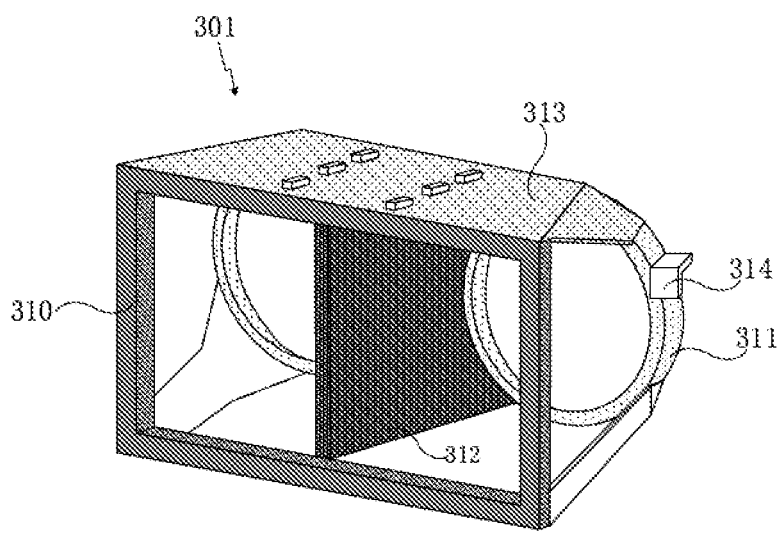
FIG. 5 is a schematic structural view of a frame assembly according to one embodiment.

FIG. 5 shows a schematic structural view of a frame assembly according to one embodiment. As shown in FIG. 5, the frame assembly 301 may comprise a first frame 310. The display screen 320 is mounted on the first frame 310. Since the shape of the display screen 320 is generally rectangular, the first frame 310 may be a rectangular frame. The display screen 320 may be fixed in the rectangular frame.

It is to be noted that a method of fixing the display screen 320 is not limited in the present disclosure. In one embodiment, a bonding method may be used. In another embodiment, a fixed position is provided on the first frame 310, and the display screen 320 is attached to the fixed position by a fixing member. The fixing member may comprise a threaded connector, a fastener, or the like.

Figure 6:
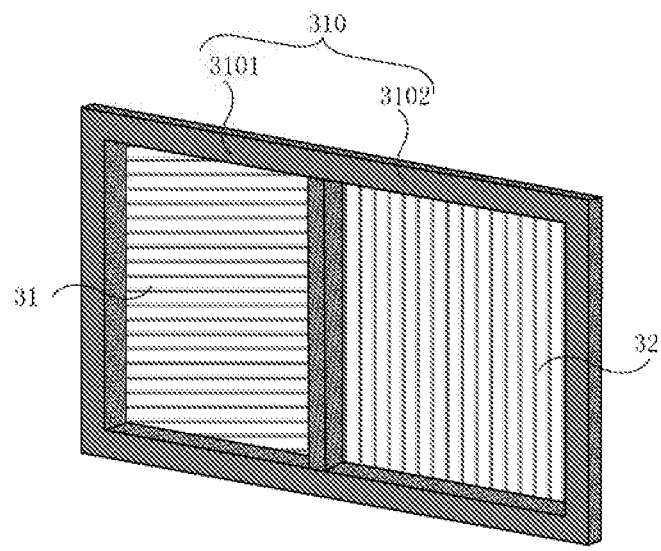
FIG. 6 is a schematic structural view of a first frame of a frame assembly with mounted sub-screens according to one embodiment.

FIG. 6 shows a schematic structural view of a first frame of a frame assembly with mounted sub-screens according to one embodiment. In one embodiment, as shown in FIG. 6, the display screen 320 may include a left-eye image sub-screen 31 for displaying a left-eye image and a right-eye image sub-screen 32 for displaying a right-eye image. As shown in FIG. 6, in this embodiment, the first frame 310 includes a first left sub-frame 3101 and a first right sub-frame 3102, both of which are located on the same horizontal plane. The left-eye image sub-screen 31 and the right-eye image sub-screen 32 are mounted on the first left sub-frame 3101 and the first right sub-frame 3102 respectively. Since shapes of the left-eye image sub-screen 31 and the right-eye image sub-screen 32 are generally rectangular, the first left sub-frame 3101 and the first right sub-frame 3102 may be rectangular frames. As such, the left-eye image sub-screen 31 and the right-eye image sub-screen 32 may be fixed in the above-described different rectangular frames respectively. The left eye image sub-screen 31 and the right-eye image sub-screen 32 may be fixed in the same manner as the display screen 320.

In addition, in order to improve 3D effect of a VR display, a display image provided by a VR all-in-one apparatus needs to have certain perceptual depth. As such, a user can infer a distance of an object according to a size of the object seen by eyes and perceive an actual size of the object. Accordingly, reality feel of the VR display can be further enhanced. In order to achieve the above object, in one embodiment, the display module 302 may also comprise an optical lens assembly 321 located on a display side of the display screen 320, as shown in FIG. 3.

Figure 7:
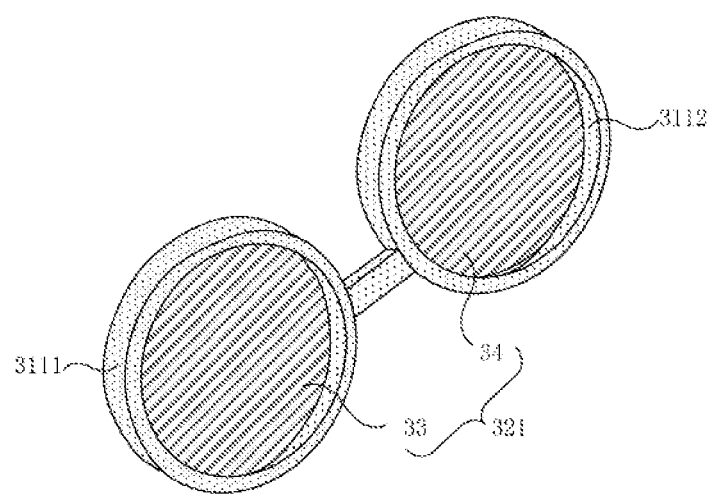
FIG. 7 is a schematic structural view of a second frame of a frame assembly with mounted optical lenses according to one embodiment.

FIG. 7 shows a schematic structural view of a second frame of a frame assembly with mounted optical lenses according to one embodiment. As shown in FIG. 7, the optical lens assembly 321 comprises a left lens subassembly 33 corresponding to a position of the left eye and a right lens subassembly 34 corresponding to a position of the right eye. Each of the left lens subassembly 33 and the right lens subassembly 34 may include at least one lens, which is thick in the center and thin on the edge. Accordingly, the left lens subassembly 33 and the right lens subassembly 34 can correct incident angles of a light on positive lens of left eye and right eye of a user respectively. The light is then re-read by the user's eyes. As such, nearby objects reaches the user's retina faster than those in distance. Furthermore, nearby objects look more three-dimensional relative to those in distance.

In one embodiment, as shown in FIG. 5, the frame assembly 301 comprises a second frame 311 opposite the first frame 310. The optical lens assembly 321 is mounted on the second frame 311.

In one embodiment, as shown in FIG. 7, when the optical lens assembly 321 comprises a left lens subassembly 33 and a right lens subassembly 34, the second frame 311 comprises a second left sub-frame 3111 and a second right sub-frame 3112, both of which are located on the same horizontal plane. In one embodiment, a method of mounting optical lens assembly 321 comprises mounting the left lens subassembly 33 and the right lens subassembly 34 on the second left sub-frame 3111 and the second right sub-frame 3112 respectively. Since the left lens subassembly 33 and the right lens subassembly 34 are generally round in shape, the second left sub-frame 3111 and the second right sub-frame 3112 may be round in shape. As such, the left lens subassembly 33 and the right lens subassembly 34 may be fixed within the second left and right sub-frames respectively. A method of fixing the optical lens assembly 321 is not limited herein.

As described above, left and right eyes of a user need to receive a left-eye image and a right-eye image respectively in order to realize a 3D display. If crosstalk happens between the left-eye image and the right-eye image and the result of the crosstalk is received by the user's eyes, quality of the 3D display is reduced or a 3D image even cannot be displayed normally. Therefore, in order to avoid the crosstalk between the left-eye image and the right-eye image, in one embodiment, as shown in FIG. 5, the frame assembly 301 further comprises a baffle plate 312. The baffle plate 312 is disposed between the first frame 310 and the second frame 311. Furthermore, the baffle plate 312 is perpendicular to the first frame 310 and the second frame 311.

In one embodiment, the second left sub-frame 3111 and the second right sub-frame 3112 in the second frame 311 are disposed on the left and right sides of the baffle plate 312 respectively. As such, the baffle plate 312 can isolate the left-eye image of the left lens subassembly 33 mounted on the second left sub-frame 3111 from the right-eye image of the right lens subassembly 34 mounted on the second right sub-frame 3112. Accordingly, probability of crosstalk between the left-eye image and the right-eye image is reduced.

In another embodiment, as shown in FIG. 3, in order to realize the VR display, the display module 302 further comprises a main control circuit board 323 for installing an application processor (AP). The application processor controls the display screen 320 to display 3D images.

In one embodiment, as shown in FIG. 5, the frame assembly 301 further comprises a third frame 313 for mounting the main control circuit board 323. The third frame 313 is located on the same side of the display screen 320 as the first frame 310 and the second frame 311. Furthermore, two ends of the third frame 313 are connected with the first frame 310 and the second frame 311 respectively. Compared with a conventional technology in which a control circuit board 323 is mounted on a non-display side of the display screen 320, the control circuit board 323 in this disclosure can be mounted on the third frame 313, which is on a display side of the display screen 320. As such, the control circuit board 323 is located at the top of the display screen 320, thereby reducing thickness of the entire display module 302. A thickness direction of the display module 302 is the same as that of the display screen 320.

It is to be noted that direction terms such as "left", "right", "top" are defined herein with respect to locations of various components in the display module 302 in the Figures. These directional terms are relative concepts and used for description and illustration purposes. These directional terms may change accordingly with the direction of the display module 302.

With improving computing and graphics processing capabilities of application processors, heat generated by the application processors also increase. Accordingly, if the heat cannot be dissipated in time, operational life span of the application processors and other components thereof are reduced.

In order to solve heat dissipation problem of an application processor, in one embodiment, the display module 302 further comprises a fan mounted on the main control circuit board 323. When in operation, the fan can increase air flow rate around the application processor on the main control circuit board 323, thereby reducing a surface temperature of the application processor. In the present disclosure, a type of the fan is not limited. In one embodiment, the fan may be an axial fan or a centrifugal fan.

Figure 8:
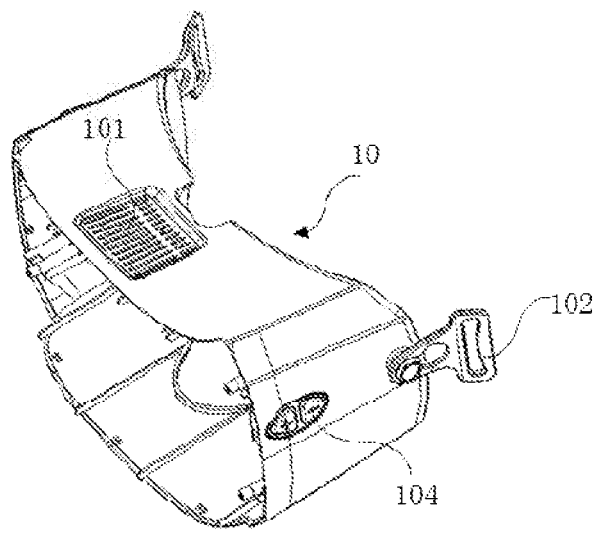
FIG. 8 is a schematic structural view of a middle frame according to one embodiment.

FIG. 8 shows a schematic structural view of a middle frame according to one embodiment. The heat generated by the application processor needs to be dissipated as soon as possible from the VR all-in-one apparatus in order to prevent the beat from affecting other components. In one embodiment, as shown in FIG. 8, a spaced heat dissipation window 101 is provided at least at a position on the middle frame 10, which corresponds to a position of the fan on the main control circuit board 323. The spaced heat dissipation window 101 is composed of a plurality of dustproof bars arranged at intervals.

In one embodiment, when a frame assembly 301 mounted with a display module 302, which is a core function module 30, is then mounted in a middle frame 10, a heat dissipation window 101 is provided above the fan on the middle frame 10. As such, the air flow rate around the application processor on the main control circuit board 323 is increased when the fan is in operation, and accordingly heat generated by the application processor is quickly dissipated out by the flowing air through the heat dissipation window 101. As a result, improvement of cooling effect is achieved.

Figure 9:
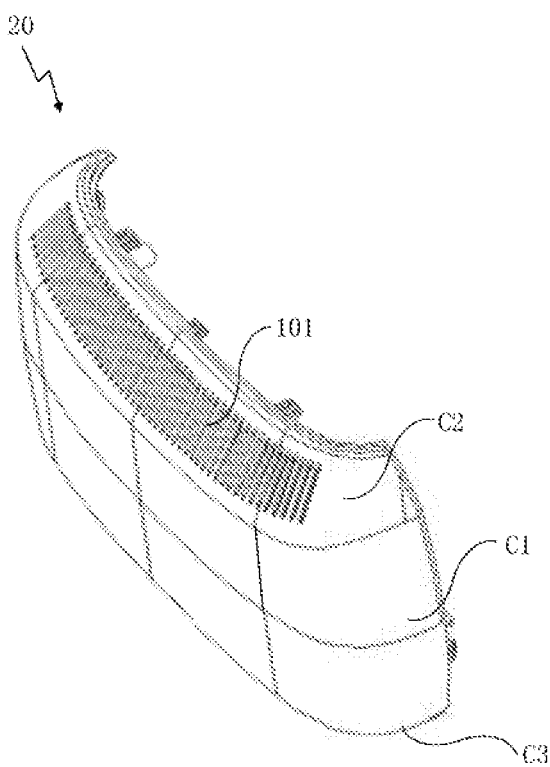
FIG. 9 is a schematic structural view of a front housing according to one embodiment.

FIG. 9 shows a schematic structural view of a front housing according to one embodiment. In order to further improve the heat dissipation effect, in another embodiment, as shown in FIG. 9, the front housing 20 may include a first surface C1 used for covering the display screen 320, a second surface C2 and a third surface C3. The second surface C2 and the third surface C3 are disposed on both sides of the first surface C1 respectively. In one embodiment, as shown in FIG. 9, a heat dissipation window 101 is provided at least on the second surface C2.

Figure 10:
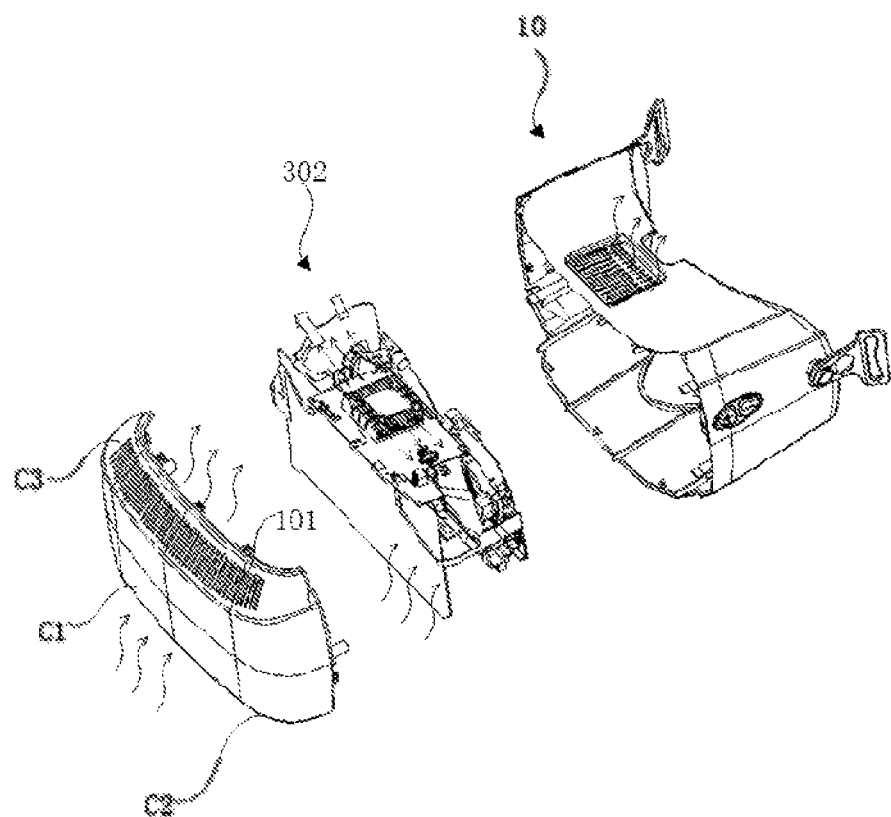
FIG. 10 is schematic diagram of internal heat dissipation path of a virtual reality all-in-one apparatus according to one embodiment.

FIG. 10 shows a schematic diagram of internal heat dissipation path of a virtual reality all-in-one apparatus according to one embodiment. As shown in FIG. 10, the third surface C3 and the surface of the middle frame 10 having the heat dissipation window 101 are provided on the same side of the first surface C1. As such, the heat dissipation window 101 on the middle frame 10 is located at the top and the heat dissipation window 101 of the second surface C2 of the front housing 20 is located at the bottom. When the core function module 30 is mounted inside the middle frame 10 and the front housing 20 is mounted on the middle frame 10, the fan rotates to draw outside air having a lower ambient temperature into the middle frame 10 through the heat dissipation window 101 provided at the bottom of the front housing 20, which is the second surface C2, along a direction indicated by the arrows in FIG. 10. In addition, heat on the main control circuit board 323 of the display module 302 is dissipated out from both ends, as indicated by the arrows, by rotation of the fan. Furthermore, the heat in the middle frame 10 can be dissipated from the heat dissipation window 101 on the middle frame 10 corresponding to the position of the fan under continuous rotation of the fan.

In another embodiment, as shown in FIG. 10, a heat dissipation window 101 is provided on the top of the front housing 20, that is, the third surface C3. Heat in the middle frame 10 can also be dissipated through the heat dissipation window 101 on the third surface C3.

The above description is only examples of installation position of the heat dissipation window 101. Those skilled in the art can also increase the number of the heat dissipation windows 101 according to actual needs. For example, a heat dissipation window 101 may be added at the bottom of the middle frame 10.

In one embodiment, respective components constituting the frame assembly 301 such as the first frame 310, the second frame 311, and the baffle plate 312 are made of metal. As such, heat dissipation effect is further improved because metal has excellent thermal conduction properties. In addition, stiffness of the frame assembly 301 made of metal is also improved.

In order to meet different needs of users, a VR apparatus may need a high-definition multimedia interface (HDMI) for inputting high-definition resources and a U disk interface. In one embodiment, as shown in FIG. 3, the display module 302 may further comprise an interface board 322 for connecting the above-described interfaces.

In another embodiment, as shown in FIG. 5, the frame assembly 301 may further comprise a fourth frame 314 disposed on a side surface of the second frame 311. The interface board 322 may be mounted on the fourth frame 314. As such, the interface board 322 may be mounted on the frame assembly 301 so as to realize modular design. In addition, because the fourth frame 314 is on the side surface of the second frame 311, the interface board 322 mounted on the frame assembly 301 is located outside the frame assembly 301, facilitating connection with the interfaces on the middle frame 10.

Figure 11:
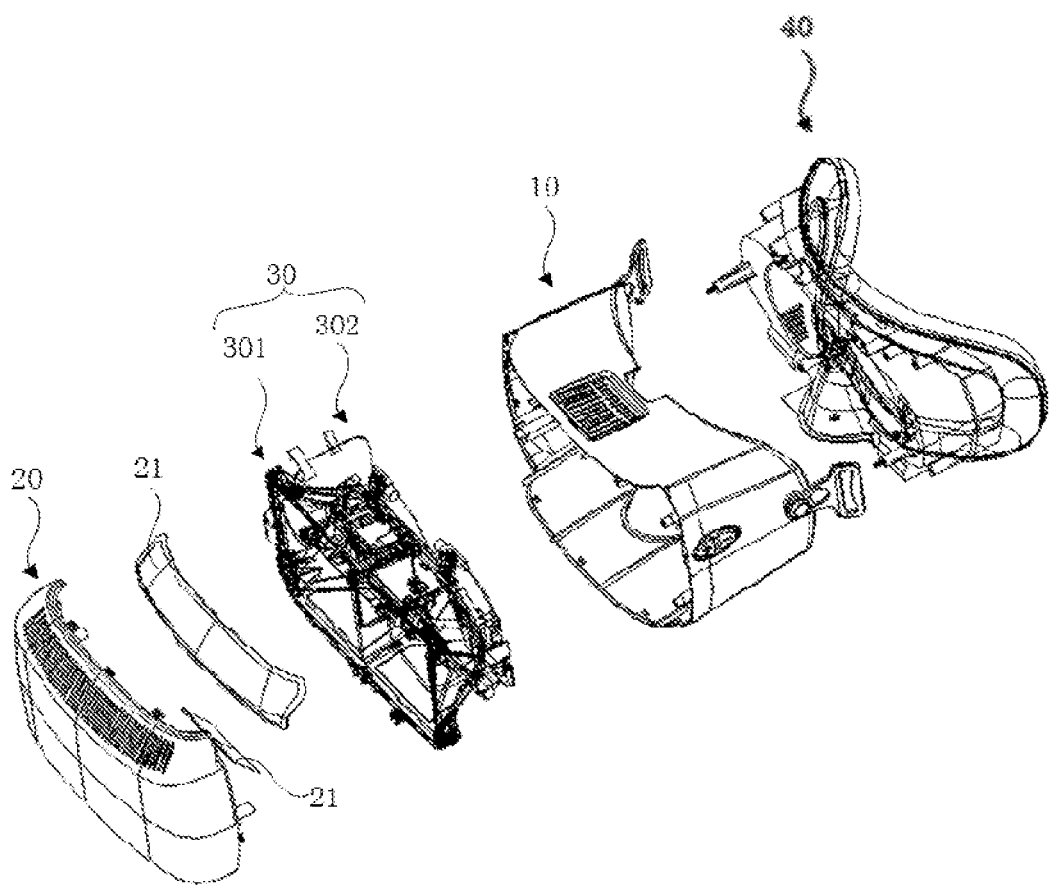
FIG. 11 is a schematic diagram of a decomposed structure of a virtual reality all-in-one apparatus according to one embodiment.

FIG. 11 shows a schematic diagram of a decomposed structure of a virtual reality all-in-one apparatus according to one embodiment. In one embodiment, a method of assembling respective components in a VR all-in-one apparatus according to one embodiment of the present disclosure is described in detail below.

First, respective components in the display assembly 302, as shown in FIG. 3, are mounted on the different frames of the frame assembly 301, as shown in FIG. 5, respectively to form a core function module 30, as shown in FIG. 11.

Then, the frame assembly 301 and the middle frame 10 are connected by a first fixing assembly, thereby mounting the core functional module 30 inside the middle frame 10. Next, in one embodiment, as shown in FIG. 11, in order to prevent external dust from entering the VR all-in-one apparatus to affect its internal components such as the display screen 320, at least one air filter 21 is mounted between the front housings 20 and the display screen 320.

Then, the frame assembly 301 is connected to the front housing 20 through a second fixing assembly. The front housing 20 is connected to the middle frame 10 through a third fixing assembly.

Figure 12:
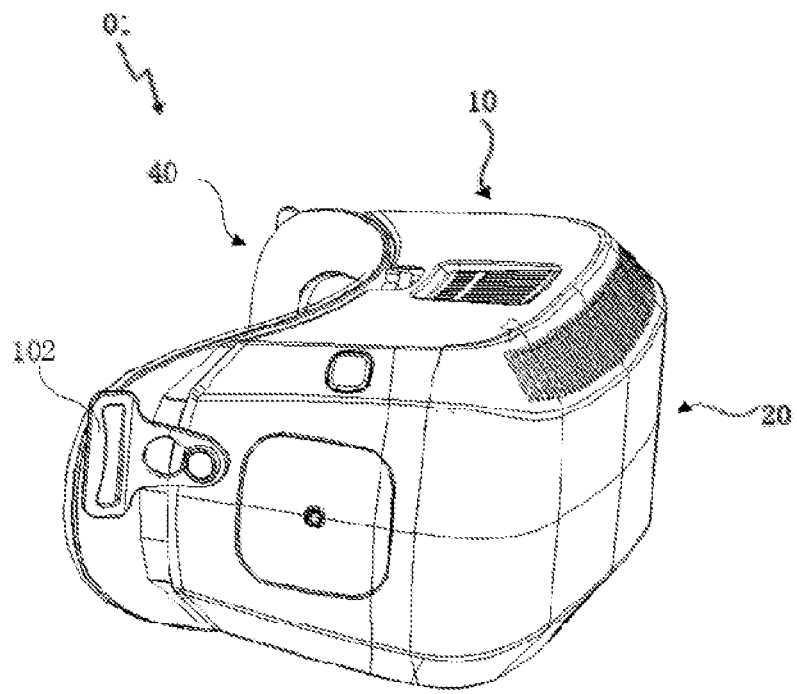
FIG. 12 is a schematic view of appearance of an assembled virtual reality all-in-one apparatus according to one embodiment.

Finally, the VR all-in-one apparatus, as shown in FIG. 11, further comprises a face-mounting assembly 40 provided on another side of the middle frame. The face-mounting assembly 40 is connected to the frame assembly 301 through a fourth fixing assembly. As such, the VR all-in-one apparatus assembly is completed. FIG. 12 shows a schematic view of appearance of an assembled virtual reality all-in-one apparatus according to one embodiment.

In the embodiment, a front end of the frame assembly 301 is connected to the front housing 20 by the second fixing assembly. A middle of the frame assembly 301 is connected to the middle frame 10 by the first fixing assembly. A rear end of the frame assembly 301 is connected to the veneer assembly 40 by the fourth fixing member. In this way, the frame assembly 301 may be subject to force in the front, middle and rear parts respectively, thereby evenly distributing the force on the entire frame assembly 301. As such, deformation of the frame assembly 301 caused by non-uniformly distributed force at one end is avoided.

In one embodiment, each of the first fixing assembly, the second fixing assembly, the third fixing assembly, and/or the fourth fixing assembly comprises a positioning pin and a matching threaded hole. The threaded hole may be formed in a component by means of an in-mold injection molding. For example, for the second fixing assembly connecting the frame assembly 301 to the front housing 20, the second fixing assembly includes threaded holes on the frame assembly 301 and the front housing 20 respectively and positioning pins for inserting into the two threaded holes to connect the frame assembly 301 and the front housing 20.

In another embodiment, the above-mentioned fixing assembly may include a hook and a matching slit. For example, for the first fixing assembly connecting the frame assembly 301 to the middle frame 10, the first fixing assembly includes a hook on the frame assembly 301 and a matching slit on the middle frame 10 to interlock with the book. Likewise, other fixing assemblies may be set up as described above and are not described here.

In addition, specific positions of the first fixing assembly, the second fixing assembly, the third fixing assembly, and the fourth fixing assembly are not limited in the present disclosure.

Figure 13:
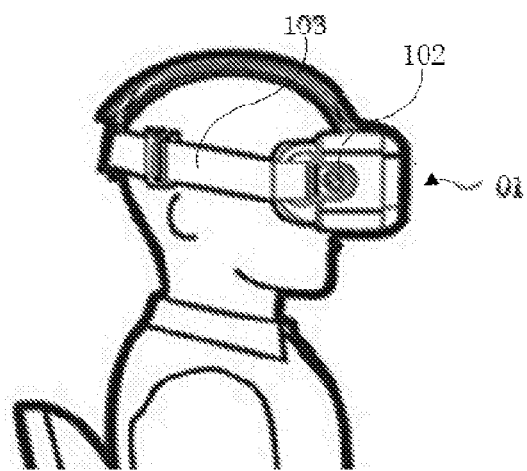
FIG. 13 is a schematic view of a user wearing a virtual reality all-in-one apparatus according to one embodiment.

FIG. 13 shows a schematic view of a user wearing a virtual reality all-in-one apparatus according to one embodiment. In one embodiment, as shown in FIG. 12 FIG. 8, in order to facilitate the user to wear the VR all-in-one apparatus, the middle frame 10 of the VR all-in-one apparatus is provided with a fixing ring 102. The fixing ring 102 is used for mounting a strap 103, as shown in FIG. 13. As such, when the VR all-in-one apparatus 01 is used by the user, a side of the face-mounting assembly 40 in the VR all-in-one apparatus 01 can be attached to the face. The strap 103 on the fixing ring 102 is then worn on the head. The strap 103 can be adjusted according to a user's head circumference to achieve best wearing effect.

In another embodiment, the middle frame 10 is further provided with a button assembly 104. The button assembly 104 may include a sound adjustment button, a screen adjustment button, or a power button, etc. The present disclosure is not limited thereto.

It will be apparent to those skilled in the art that various changes and modifications can be made in the present invention without departing from the spirit and scope of the present invention. Thus, it is intended that the present invention encompasses such modifications and variations if they come within the scope of the appended claims or the equivalents thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DESCRIPTION OF SYMBOLS IN THE FIGURES

01—Virtual Reality (VR) all-in-one apparatus
10—middle frame
101—heat dissipation window
102—fixing ring
103—strap
104—button assembly
20—front housing
21—air filter
30—core function module
301—Frame assembly
310—first frame
3101—first left sub-frame
3102—first right sub-frame
311—second frame
3111—second left sub-frame
3112—second right sub-frame
312—baffle plate
313—third frame
314—fourth frame
302—display module
320—display
3201—display screen body
3202—slit grating
31—Left eye image sub-screen
32—right eye image sub-screen
321—Optical lens assembly
33—left optical lens assembly
34—right optical lens assembly
322—Interface board
323—main control circuit board
40—face-mounting assembly

What is claimed is:

1. A virtual reality all-in-one apparatus comprising:
a middle frame,
   a front housing on a side of the middle frame, and
   a core function module inside the middle frame,
      wherein the core function module comprises a frame assembly and a display module mounted on the frame assembly;
      the display module comprises a display screen, the display screen comprises a display screen body and a slit grating located on a display side of the display screen body, and the slit grating comprises slits formed between light-shielding stripes;
      the display module further comprises a main control circuit board and the frame assembly further comprises a third frame for mounting the main control circuit board, wherein the third frame is on a same side of the display screen as a first frame and a second frame, and two ends of the third frame are connected with the first frame and the second frame respectively; and
      the virtual reality all-in-one apparatus further comprises a button assembly on the middle frame, and the button assembly comprises a sound adjustment button, a screen adjustment button, or a power button.

2. The virtual reality all-in-one apparatus according to claim 1, wherein the display module comprises the display screen and an optical lens assembly located on a display side of the display screen, and
   the frame assembly comprises the first frame and the second frame opposite the first frame, the display screen being mounted on the first frame and the optical lens assembly being mounted on the second frame.

3. The virtual reality all-in-one apparatus according to claim 2, wherein the optical lens assembly comprises a left lens subassembly and a right lens subassembly, the second frame comprises a second left sub-frame and a second right sub-frame located at the same level, and the left lens subassembly and the right lens subassembly are mounted on the second left sub-frame and the second right sub-frame respectively.

4. The virtual reality all-in-one apparatus according to claim 3, further comprising a baffle plate between the first frame and the second frame, the baffle plate perpendicular to the first frame and the second frame, and the second left sub-frame and the second right sub-frame on both sides of the baffle plate respectively.

5. The virtual reality all-in-one apparatus according to claim 1, further comprising a fan on the main control circuit board and a heat dissipation window on the middle frame corresponding to a position of the fan.

6. The virtual reality all-in-one apparatus according to claim 5, wherein the fan is an axial fan or a centrifugal fan.

7. The virtual reality all-in-one apparatus according to claim 5, wherein the heat dissipation window comprises a plurality of dustproof bars arranged at intervals.

8. The virtual reality all-in-one apparatus according to claim 5, wherein the front housing comprises a first surface covering the display screen, a second surface and a third surface on both sides of the first surface respectively, wherein a heat dissipation window is on the second surface, and the third surface and the surface of the middle frame having the heat dissipation window are on the same side of the first surface.

9. The virtual reality all-in-one apparatus according to claim 8, wherein a heat dissipation window is on the third surface.

10. The virtual reality all-in-one apparatus according to claim 2, wherein the display module further comprises an interface board, the frame assembly further comprises a fourth frame on a side of the second frame, and the interface board mounted on the fourth frame.

11. The virtual reality all-in-one apparatus according to claim 1, wherein the frame assembly and the middle frame are connected by a first fixing assembly, the frame assembly and the front housing are connected by a second fixing assembly, and the front housing and the middle frame are connected by a third fixing assembly.

12. The virtual reality all-in-one apparatus according to claim 1, further comprising a face-mounting assembly at a side of the middle frame opposite to the front housing, wherein the face-mounting assembly is connected to the frame assembly through a fourth fixing assembly.

13. The virtual reality all-in-one apparatus according to claim 12, wherein each of the first fixing assembly, the second fixing assembly, the third fixing assembly, or the fourth fixing assembly comprises a positioning pin and a matching threaded hole, or a hook and a matching slit.

14. The virtual reality all-in-one apparatus according to claim 2, wherein an air filter is arranged between the front housing and the display screen.

15. The virtual reality all-in-one apparatus according to claim 1, wherein the frame assembly is made of metal.

* * * * *